(12) United States Patent
Yu

(10) Patent No.: US 12,084,291 B2
(45) Date of Patent: Sep. 10, 2024

(54) HIGH-SPEED AND HIGH-PRECISION RFID DETECTION TUNNEL MACHINE AND WORKING METHOD THEREOF

(71) Applicant: WUXI HYESOFT SOFTWARE TECHNOLOGY CO., LTD., Wuxi (CN)

(72) Inventor: Liqun Yu, Wuxi (CN)

(73) Assignee: WUXI HYESOFT SOFTWARE TECHNOLOGY CO., LTD., Wuxi (CN)

(*) Notice: Subject to any disclaimer, the term of this patent is extended or adjusted under 35 U.S.C. 154(b) by 0 days.

(21) Appl. No.: 18/409,511

(22) Filed: Jan. 10, 2024

(65) Prior Publication Data

US 2024/0140726 A1 May 2, 2024

Related U.S. Application Data

(63) Continuation of application No. PCT/CN2022/090229, filed on Apr. 29, 2022.

(30) Foreign Application Priority Data

Sep. 14, 2021 (CN) .......................... 202111076517.5

(51) Int. Cl.
*B65G 43/10* (2006.01)
*B65G 15/22* (2006.01)
(Continued)

(52) U.S. Cl.
CPC ............. *B65G 43/10* (2013.01); *B65G 15/22* (2013.01); *B65G 43/08* (2013.01); (Continued)

(58) Field of Classification Search
CPC ........ B65G 43/08; B65G 43/10; B65G 15/22; B65G 2203/0216; B65G 2203/046; (Continued)

(56) References Cited

U.S. PATENT DOCUMENTS 10,994,944 B1 * 5/2021 Knight .................. B65G 15/30
11,295,099 B2 * 4/2022 Yu ...................... G06K 7/10356
(Continued)

FOREIGN PATENT DOCUMENTS

CN 105844307 A 8/2016
CN 110227657 A 9/2019
(Continued)

OTHER PUBLICATIONS

First Office Action issued in counterpart Chinese Patent Application No. 202111076517.5, dated Jan. 26, 2022.

*Primary Examiner* — Thomas Randazzo
(74) *Attorney, Agent, or Firm* — Westbridge IP LLC

(57) ABSTRACT

A high-speed and high-precision Radio Frequency Identification (RFID) detection tunnel machine includes: an RFID reader-writer and an RFID antenna; a first conveying line, which conveys a carrier, and the carrier includes at least one RFID tag; a tunnel machine body, which is configured for the first conveying line to pass through, and covers the reading range; and a second conveying line, which conveys the carrier and ensures that the first conveying line only has one carrier. In the application, the second conveying line is disposed, and its relevant parameters may be adjusted according to parameters of the first conveying line and position of the carrier on the first conveying line, so as to realize continuous operation of the tunnel machine and ensure timely supplement of the carrier on the first conveying line.

9 Claims, 5 Drawing Sheets

(51) Int. Cl.
*B65G 43/08* (2006.01)
*G06K 7/10* (2006.01)

(52) U.S. Cl.
CPC ..... *G06K 7/10297* (2013.01); *G06K 7/10415* (2013.01); *G06K 7/10425* (2013.01); *G06K 7/10445* (2013.01); *B65G 2203/0216* (2013.01); *B65G 2203/046* (2013.01)

(58) Field of Classification Search
CPC .... B65G 15/24; B65G 47/52; G06K 7/10297; G06K 7/10415; G06K 7/10425; G06K 7/10445; G06K 17/00
See application file for complete search history.

(56) References Cited

U.S. PATENT DOCUMENTS

| | | | | |
|---|---|---|---|---|
| 2006/0226989 | A1* | 10/2006 | Hillegass | H01Q 1/2241 |
| | | | | 340/572.7 |
| 2014/0343720 | A1* | 11/2014 | Danelski | G05B 19/124 |
| | | | | 700/225 |
| 2015/0246735 | A1* | 9/2015 | Roux | B65G 43/08 |
| | | | | 700/226 |
| 2018/0155133 | A1* | 6/2018 | Harnesk | B65G 43/08 |
| 2020/0074126 | A1* | 3/2020 | Winkler | G06K 7/10861 |
| 2020/0324973 | A1* | 10/2020 | Edwards | G06Q 10/10 |
| 2021/0323772 | A1* | 10/2021 | Henze | G05B 19/4189 |
| 2022/0024699 | A1* | 1/2022 | Godazandeh | B65G 37/02 |

FOREIGN PATENT DOCUMENTS

| | | |
|---|---|---|
| CN | 110495760 A | 11/2019 |
| CN | 214262829 U | 9/2021 |

* cited by examiner though adjustment on the second conveying line, the present application realizes high-speed and high-precision identification of the RFID, and comprehensively improves sorting and reading efficiency of the tunnel machine.

HIGH-SPEED AND HIGH-PRECISION RFID DETECTION TUNNEL MACHINE AND WORKING METHOD THEREOF

CROSS-REFERENCE TO RELATED APPLICATIONS

This application is a continuation of International Application No. PCT/CN2022/090229, filed on Apr. 29, 2022, which claims priority to Chinese Patent Application No. 202111076517.5, filed on Sep. 14, 2021. All of the aforementioned applications are incorporated herein by reference in their entireties.

TECHNICAL FIELD

The application relates to the technical field of Radio Frequency Identification (RFID), in particular to a high-speed and high-precision RFID detection tunnel machine and a working method thereof.

BACKGROUND

With rapid development of electronic commerce, tens of thousands or even hundreds of thousands of single commodities are often sorted and delivered in a short time, and particularly during promotion of the commodities, the situation requires that all relevant links involved in the logistics process have a high automation degree, otherwise, the efficiency is difficult to meet. In order to achieve the above purpose, an RFID tunnel machine combining RFID technology and various automatic structures is currently used to realize rapid sorting, identification, and reading of the commodities.

SUMMARY

However, in a use process of an existing RFID tunnel machine, one conveying line is adopted, then when a previous RFID tag is not read, reading time needs to be prolonged in a pause mode, and misreading caused by approach of a following article also needs to be avoided. In an actual working process, since the supply time interval of articles has non-uniformity originally, there may be a case that the supply of the following article needs to be waited after reading of the previous RFID tag is completed. No matter which mode is adopted, the working efficiency is influenced to a great extent.

In view of the above problems, the present inventor has studied and innovated based on many years of rich experience and professional knowledge in the art, and together with theoretical analysis, in order to develop a high-speed and high-precision RFID detection tunnel machine and a working method thereof.

The application provides a high-speed and high-precision RFID detection tunnel machine, which may effectively solve the problems in the background, and the application also requests to protect a working method of the high-speed and high-precision RFID detection tunnel machine, which has the same technical effect.

The technical purpose of the application is realized by the following technical solution: a high-speed and high-precision RFID detection tunnel machine includes: an RFID reader-writer and an RFID antenna, the RFID reader-writer sends a signal to the RFID antenna, and the signal is converted by the RFID antenna and then is emitted outwards to form a reading range; a first conveying line, which conveys a carrier, and the carrier includes at least one RFID tag; a tunnel machine body, which provides a through space with two open ends, the through space being configured for the first conveying line to pass through, and also provides positions for installing the RFID reader-writer and the RFID antenna, and the tunnel machine body covers the reading range; and a second conveying line, which is butted with the first conveying line to convey the carrier and ensure that the first conveying line only has one carrier.

Furthermore, the RFID antenna is a circularly polarized antenna.

Furthermore, a third conveying line is further included, which is configured to cache the carrier and convey the carrier to the second conveying line which is unloaded one by one. A working method of the high-speed and high-precision RFID detection tunnel machine includes: initial conveying speeds of the first conveying line and the second conveying line are set; when a following carrier arrives at the second conveying line, whether the first conveying line has a previous carrier or not is judged: if so, conveying time of the previous carrier since removed from the first conveying line is calculated according to a ratio of residual conveying length to conveying speed of the first conveying line, real-time speed of the second conveying line is calculated according to a ratio of conveying length of the second conveying line to the conveying time, and the conveying speed of the second conveying line is updated to the real-time speed; otherwise, the conveying speed of the second conveying line is maintained.

Furthermore, the ratio of the initial conveying speeds of the first conveying line and the second conveying line is inversely proportional to the conveying length of the two.

Furthermore, the initial conveying speed of the first conveying line is smaller than or equal to a ratio of effective reading length to set reading time of the RFID antenna, and the effective reading length is smaller than length of the tunnel machine body.

Furthermore, power of the signal is adjusted within a set range according to change of speed difference of the first conveying line and the second conveying line.

Furthermore, initial conveying speeds of the first conveying line and the second conveying line are set; a carrier is cached through the third conveying line, and the carrier is conveyed to the second conveying line when the second conveying line is unloaded; when a following carrier arrives at the second conveying line, whether the first conveying line has the previous carrier or not is judged: if so, conveying time of the previous carrier since removed from the first conveying line is calculated according to a ratio of residual conveying length to conveying speed of the first conveying line, real-time speed of the second conveying line is calculated according to a ratio of conveying length of the second conveying line to the conveying time, and the conveying speed of the second conveying line is updated to the real-time speed; otherwise, the conveying speed of the second conveying line is maintained.

Furthermore, weight of the carrier on the second conveying line is detected, and the power of the signal is adjusted within a set range according to the weight detection result.

In summary, the application has the following beneficial effects: in the application, the second conveying line is disposed, and its relevant parameters may be adjusted according to parameters of the first conveying line and position of the carrier on the first conveying line, so as to realize continuous operation of the tunnel machine and ensure timely supplement of the carrier on the first conveying line. Through the above modes of providing control basis and real-time adjustment of parameters, an RFID tag contained on a carrier whose front and back distance has difficulty in ensuring uniformity may be effectively read, and meanwhile, the efficiency is maximized.

BRIEF DESCRIPTION OF THE DRAWINGS

In order to describe the technical solutions in the embodiments of the application or the relevant art more clearly, the drawings required to be used in descriptions about the embodiments or the relevant art will be simply introduced below, obviously, the drawings described below are only some embodiments of the application, and other drawings can further be obtained by those of ordinary skill in the art according to the drawings without creative work.

DETAILED DESCRIPTION OF THE EMBODIMENTS

The technical solutions in the embodiments of the application are clearly and completely described below in conjunction with the accompanying drawings in the embodiments of the application. Apparently, the embodiments described are only a part rather than all of the embodiments of the application.

It is to be noted that when an element is referred to as being 'fixed' to another element, it may be directly on the other element or a medium element may also be present. When an element is referred to as being "connected" to another element, it may be directly connected to the other element or a medium element may also be present. As used herein, the terms "vertical", "horizontal", "left", "right", and similar expressions are only adopted for description, and are not meant to be the only implementation modes.

Unless otherwise defined, all technical and scientific terms used herein have the same meaning as those normally understood by those skilled in the art to which the application belongs. The terms used in the specification of the application are merely to describe the specific embodiments, rather than to limit the application. As used herein, the term "and/or" includes any and all combinations of one or more of the associated listed items.

Embodiment 1

Figure 1:
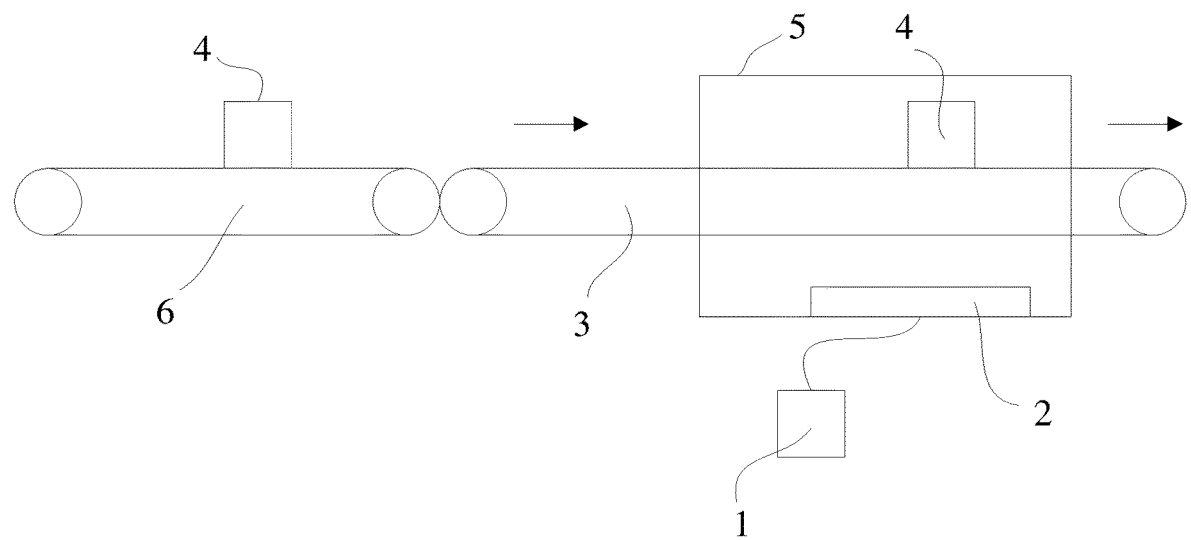
FIG. 1 is a schematic structure diagram of a high-speed and high-precision RFID detection tunnel machine in Embodiment 1.

As shown in FIG. 1, a high-speed and high-precision RFID detection tunnel machine includes: an RFID reader-writer 1 and an RFID antenna 2, the RFID reader-writer 1 sends a signal to the RFID antenna 2, and the signal is converted by the RFID antenna 2 and then is emitted outwards to form a reading range; a first conveying line 3, which conveys a carrier 4, and the carrier 4 includes at least one RFID tag; a tunnel machine body 5, which provides a through space with two open ends, the through space being configured for the first conveying line 3 to pass through, and also provides positions for installing the RFID reader-writer 1 and the RFID antenna 2, and the tunnel machine body 5 covers the reading range; and a second conveying line 6, which is butted with the first conveying line 3 to convey the carrier 4 and ensure that the first conveying line 3 only has one carrier 4.

In the application, the second conveying line 6 is disposed, and its relevant parameters may be adjusted according to parameters of the first conveying line 3 and position of the carrier 4 on the first conveying line 3, so as to realize continuous operation of the first conveying line 3 and the second conveying line 6 and ensure timely supplement of the carrier 4 on the first conveying line 3. Through the above modes of providing control basis and real-time adjustment of parameters, a carrier 4 whose front and back distance has difficulty in ensuring uniformity may be effectively read, and meanwhile, the efficiency is maximized.

In the implementation process, in order to avoid interference to the signal, screen curtains will be disposed at two open ends of the tunnel machine body 5, which will inevitably affect the working efficiency, so it is not suitable for high-speed detection. In order to solve the above problems, as an optimization of the embodiment, the RFID antenna 2 is a circularly polarized antenna. Due to adoption of the circularly polarized antenna, the RFID tag is less sensitive to the orientation of the antenna, so that the use quantity of the RFID antenna 2 may be reduced, therefore, the size requirements of the whole tunnel machine body 5 may be reduced, more importantly, the reading range may be more effectively controlled, thus saving the use of the screen curtain.

Figure 2:
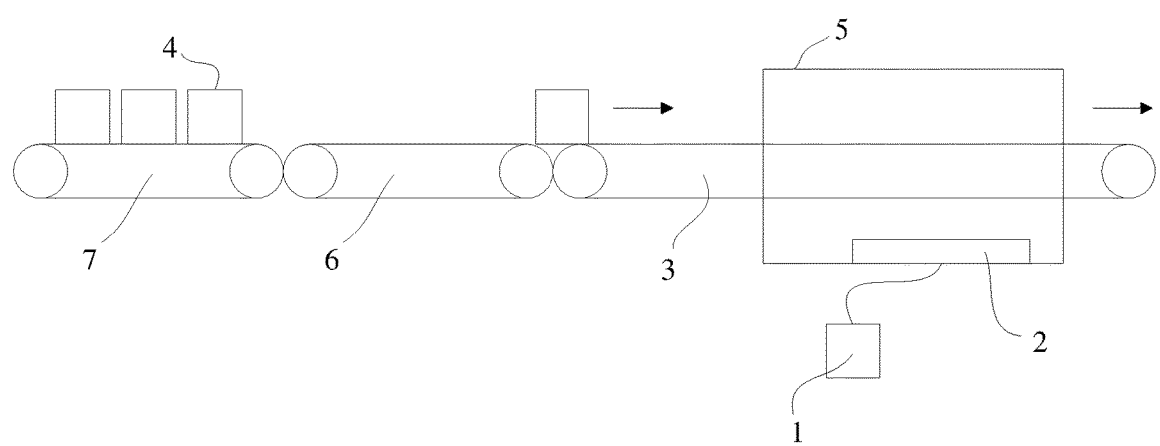
FIG. 2 is an optimized schematic diagram of a high-speed and high-precision RFID detection tunnel machine in FIG. 1.

In the embodiment, since the second conveying line 6 has a speed change process, in order to ensure timely supply of the carrier 4 thereon, as an optimization of the embodiment, as shown in FIG. 2, a third conveying line 7 is further included, which is configured to cache the carrier 4 and convey the carrier 4 to the second conveying line 6 which is unloaded one by one.

In the use process, it is necessary to ensure that the carrier 4 on the third conveying line 7 does not stack and is arranged in the conveying direction, the spacing with reduced arrangement is better, which may enable action response of conveying the carrier 4 to the second conveying line 6 more sensitive. Of course, the purpose of the application may be realized with uniform or uneven spacing. By controlling start and stop of the third conveying line 7, the carrier 4 may be conveyed to the second conveying line 6 at any time needed.

The carrier 4 referred to in the embodiment may be a hard container, such as a plastic box or a paper box, or a flexible bag body, such as a plastic bag, which may realize gathering of a plurality of RFID tags.

Data of an experiment conducted according to the embodiment are as follows.

Experimental parameters are as follows: 1. Maximum identification distance of RFID antenna 2: within 3 m; 2. Number of RFID tags contained in carrier 4<30; 3. Operation speed of first conveying line 3: 160 m/min; 4. The RFID reader 1 outputs RF power range: 8 dBm-30 dBm, step by 1 dB.

Experimental result: 1. Reading efficiency: 30 parcels are read, the number of tags on each parcel is 2-10, the longest reading time is 1.052 s, and the shortest reading time is 0.804 s; 2. Reading accuracy rate: 100%.

Experiment 2: 1. Maximum identification distance of RFID antenna 2: within 3 m; 2. Number of RFID tags contained in carrier 4: 250-300; 3. Operation speed of first conveying line 3: 1 m/s; 4. The RFID reader 1 outputs RF power range: 14 dBm-30 dBm, step by 1 dB.

Experimental result: 1. Reading efficiency: 1 parcel is read, the reading is repeated for 8 times, the number of tags on the parcel is 300, the longest reading time is 2.698 s and the shortest reading time is 2.241 s which are both smaller than 3 s; 2. Reading accuracy rate: 100%.

Embodiment 2

As shown in FIG. 1, a high-speed and high-precision RFID detection tunnel machine includes: an RFID reader-writer 1 and an RFID antenna 2, the RFID reader-writer 1 sends a signal to the RFID antenna 2, and the signal is converted by the RFID antenna 2 and then is emitted outwards to form a reading range; a first conveying line 3, which conveys a carrier 4, and the carrier 4 includes at least one RFID tag; a tunnel machine body 5, which provides a through space with two open ends, the through space being configured for the first conveying line 3 to pass through, and also provides positions for installing the RFID reader-writer 1 and the RFID antenna 2, and the tunnel machine body 5 covers the reading range; and a second conveying line 6, which is butted with the first conveying line 3 to convey the carrier 4 and ensure that the first conveying line 3 only has one carrier 4.

Figure 3:
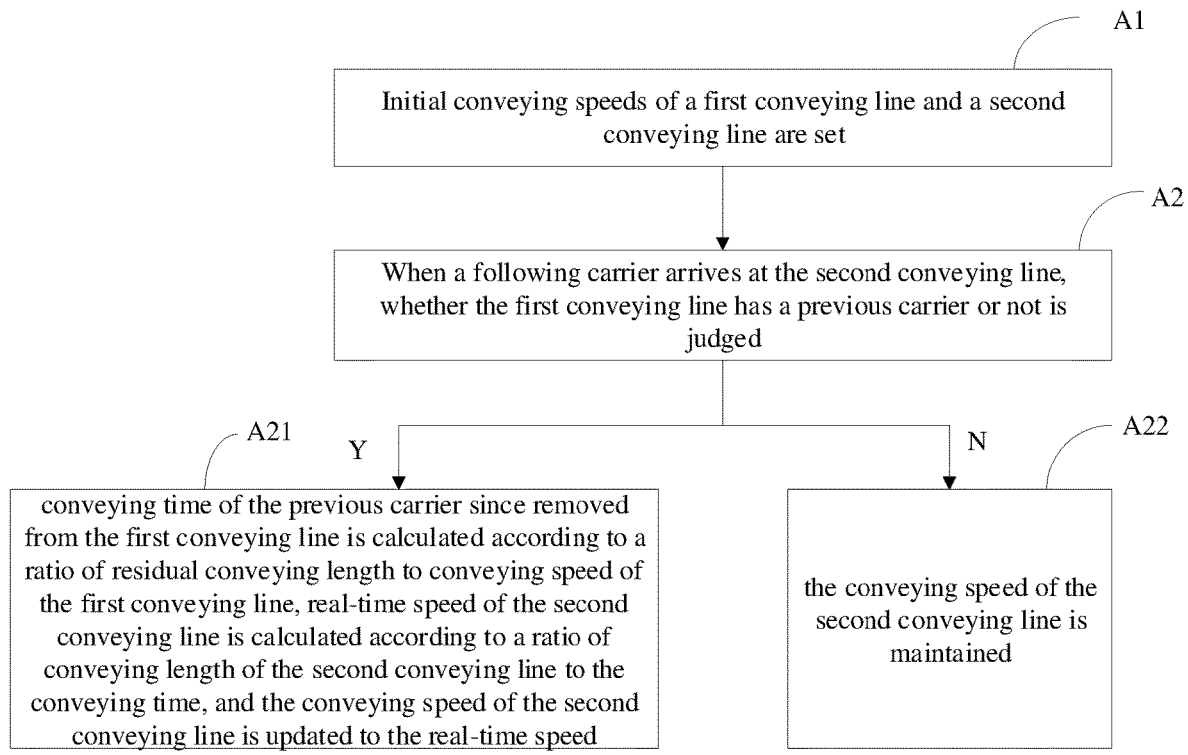
FIG. 3 is flowchart of a working method of a high-speed and high-precision RFID detection tunnel machine in Embodiment 2.

In the embodiment, in a process of using the high-speed and high-precision RFID detection tunnel machine, the following working method is adopted, which, as shown in FIG. 3, includes the following steps: A1: initial conveying speeds of the first conveying line 3 and the second conveying line 6 are set; A2: when the following carrier 4 arrives at the second conveying line 6, whether the first conveying line 3 has the previous carrier 4 or not is judged, and the following operations are selectively carried out: A21: if so, the conveying time of the previous carrier 4 since removed from the first conveying line 3 is calculated according to a ratio of residual conveying length to conveying speed of the first conveying line 3, real-time speed of the second conveying line 6 is calculated according to a ratio of conveying length of the second conveying line 6 to the conveying time, and the conveying speed of the second conveying line 6 is updated to the real-time speed; A22: otherwise, the conveying speed of the second conveying line 6 is maintained.

In the embodiment, the technical purpose to be realized is to convey the carrier 4 to the first conveying line 3 in a timely and effective manner, and when the first conveying line 3 has the previous carrier 4, the following two possibilities exist.

Figure 4:
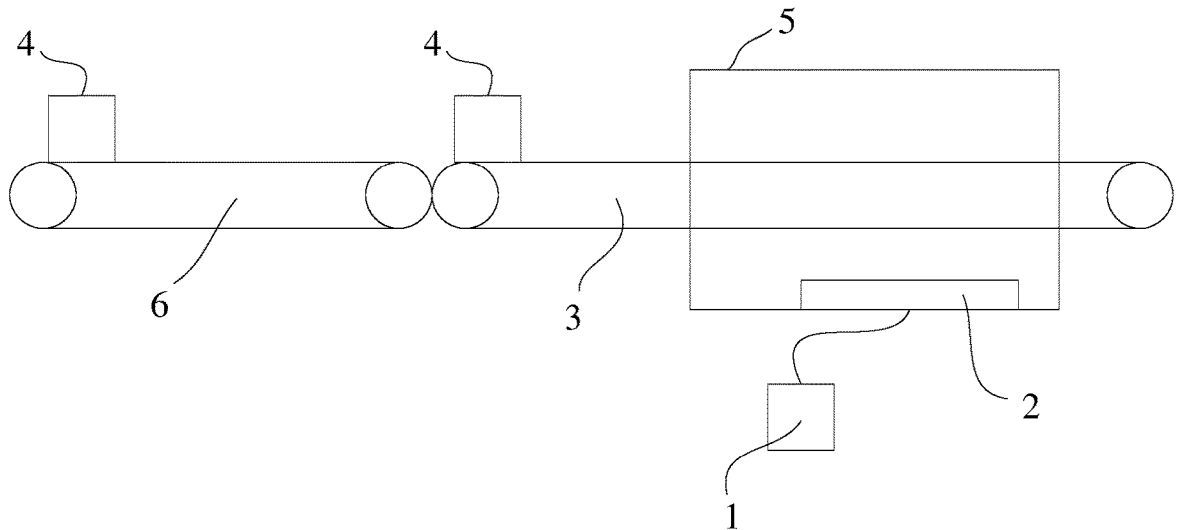
FIG. 4 is a schematic diagram when a first conveying line and a second conveying line obtain carrier supply at the same time in Embodiment 2.
Figure 5:
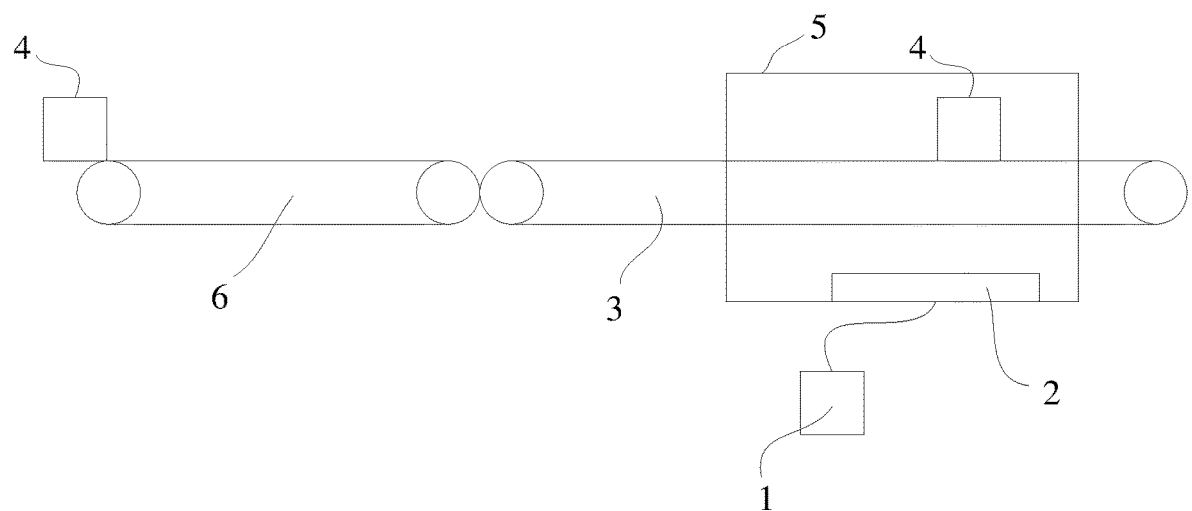
FIG. 5 is a schematic diagram illustrating that a second conveying line obtains carrier supply only when a previous carrier is conveyed to a middle position on a first conveying line in Embodiment 2.

First: as shown in FIG. 4, the first conveying line 3 and the second conveying line 6 obtain supply of the carrier 4 at the same time, in this case, the two conveying lines also realize the optimal removal of the carrier 4, that is, when the previous carrier 4 is removed from the first conveying line 3, the following carrier 4 just arrives at the first conveying line 3, in this case, the efficiency is the optimal; second: as shown in FIG. 5, when the previous carrier 4 has been conveyed to the middle position on the first conveying line 3, due to the problem of spacing of the carrier 4, the second conveying line 6 then obtains the supply of the carrier 4, in such a case, in order to ensure that the first conveying line 3 conveys the carrier 4 with the original speed, it is necessary to improve the conveying speed of the second conveying line 6, and therefore, the first conveying line 3 obtains timely supplement when the carrier 4 is removed.

No matter which possibility mentioned above, the real-time speed of the second conveying line 6 may be obtained by the calculation method in A21 in the embodiment. However, when it is ensured that the carrier 4 is continuously conveyed, the first conveying line 3 and the second conveying line 6 may obtain a stable speed relationship under the first possibility.

Figure 6:
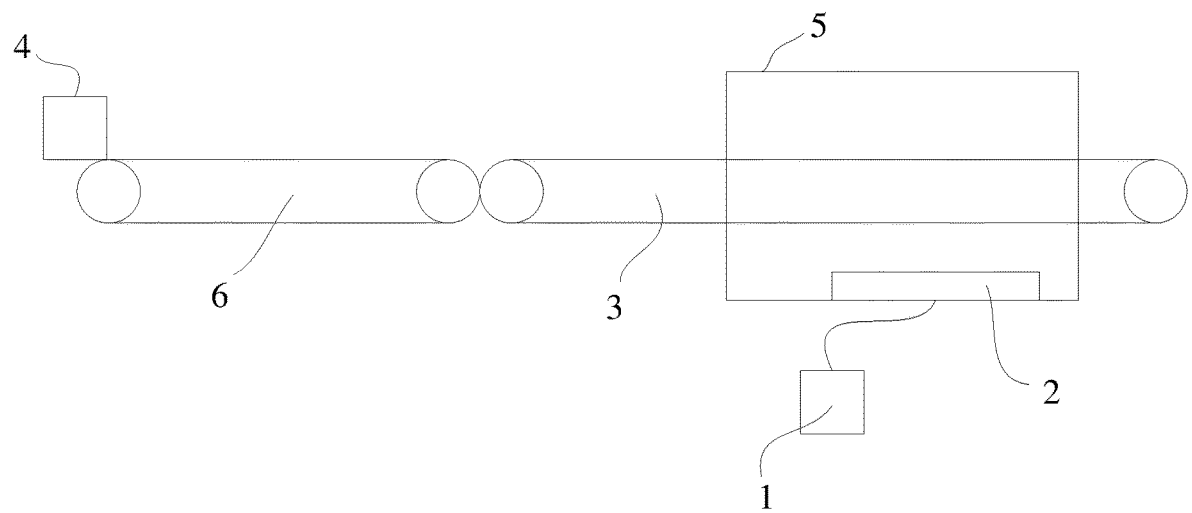
FIG. 6 is a schematic diagram illustrating that a first conveying line does not have a previous carrier when a following carrier arrives at a second conveying line.

When A22 is carried out, as shown in FIG. 6, it is usually the initial detection stage, so it is not necessary to start adjusting the conveying speed.

As an optimization of the embodiment, the ratio of the conveying speeds of the first conveying line 3 and the second conveying line 6 is inversely proportional to the conveying length of the two, and this speed ratio relationship may establish a continuous and stable working mode of the first conveying line 3 and the second conveying line 6 under the first possibility.

The initial conveying speed of the first conveying line 3 is smaller than or equal to the ratio of the effective reading length to the set reading time of the RFID antenna 2, the effective reading length is smaller than the length of the tunnel machine body 5, so as to ensure that the first conveying line 3 may realize effective reading of all RFID tags under the effective reading length and set reading time, and the reading action is completed in the tunnel machine body 5.

Embodiment 3

Figure 7:
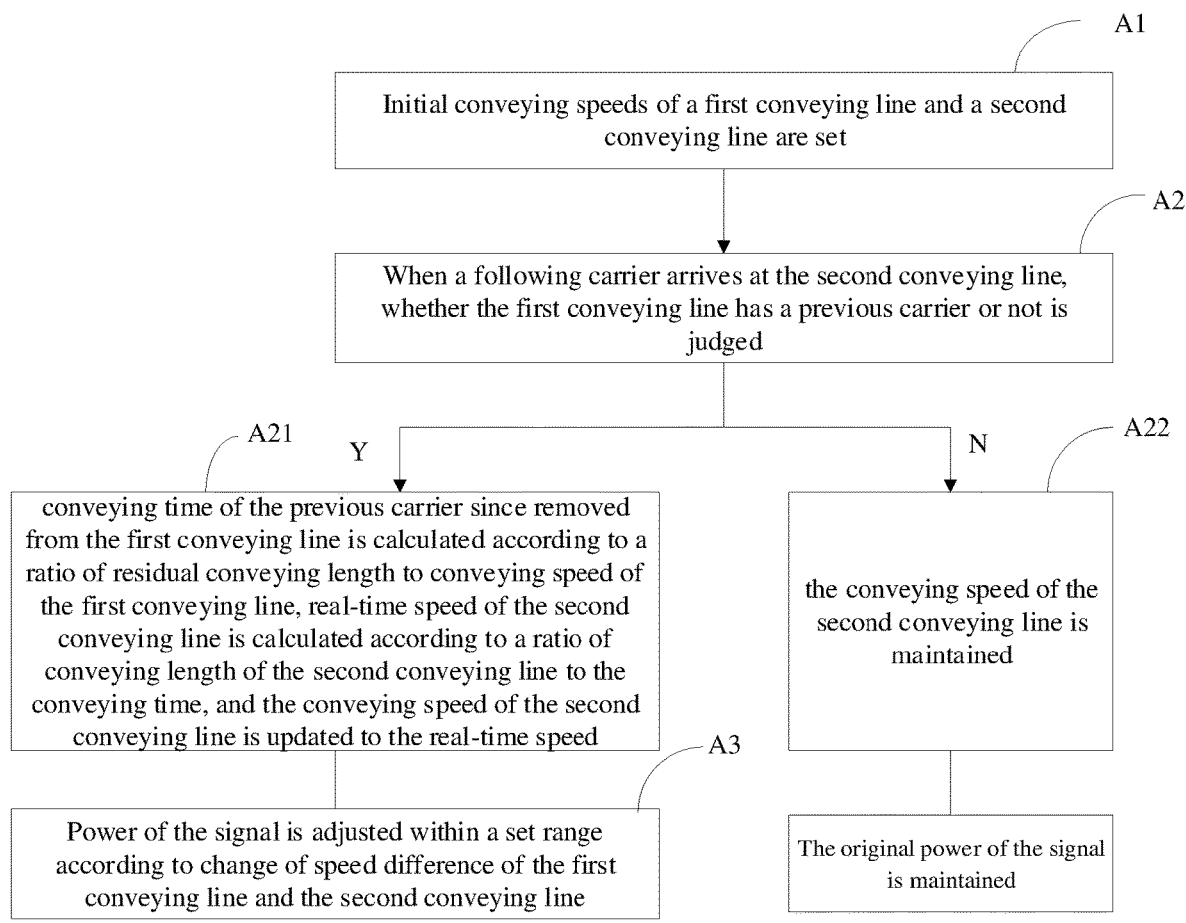
FIG. 7 is a flow chart of a working method of a high-speed and high-precision RFID detection tunnel machine in Embodiment 3.

This embodiment is optimized on the basis of the working method of the high-speed and high-precision RFID detection tunnel machine in Embodiment 2, which, as shown in FIG. 7, further includes: A3, power of the signal is adjusted within a set range according to change of speed difference of the first conveying line 3 and the second conveying line 6.

When the speed difference does not change, the original power of the signal is maintained.

After A21 is completed, the speed difference of the first conveying line 3 and the second conveying line 6 inevitably changes, which is caused by speed increase of the second conveying line 6, through speed increase of the second conveying line 6, the original relative speed relationship between the previous and following carriers 4 changes, and the speed that the following carrier 4 approaches to the tunnel machine body 5 increases, in such a case, in order to avoid the misreading of the RFID tag in the following carrier 4 by the RFID antenna 2, the power of the signal may be reduced within the set range, and the reading range may be appropriately reduced, so as to ensure that the reading ability of the RFID tag originally located on the first conveying line 3 is still met, while the reading ability for the RFID tag of the following carrier 4 approaching from a long distance is weakened, which may effectively avoid the occurrence of misreading.

Embodiment 4

As shown in FIG. 1, a high-speed and high-precision RFID detection tunnel machine includes: an RFID reader-writer 1 and an RFID antenna 2, the RFID reader-writer 1 sends a signal to the RFID antenna 2, and the signal is converted by the RFID antenna 2 and then is emitted outwards to form a reading range; a first conveying line 3, which conveys a carrier 4, and the carrier 4 includes at least one RFID tag; a tunnel machine body 5, which provides a through space with two open ends, the through space being configured for the first conveying line 3 to pass through, and also provides positions for installing the RFID reader-writer 1 and the RFID antenna 2, and the tunnel machine body 5 covers the reading range; a second conveying line 6, which is butted with the first conveying line 3 to convey the carrier 4 and ensure that the first conveying line 3 only has one carrier 4; and a third conveying line 7, which is configured to cache the carrier 4 and convey the carrier 4 to the second conveying line 6 which is unloaded one by one.

Figure 8:
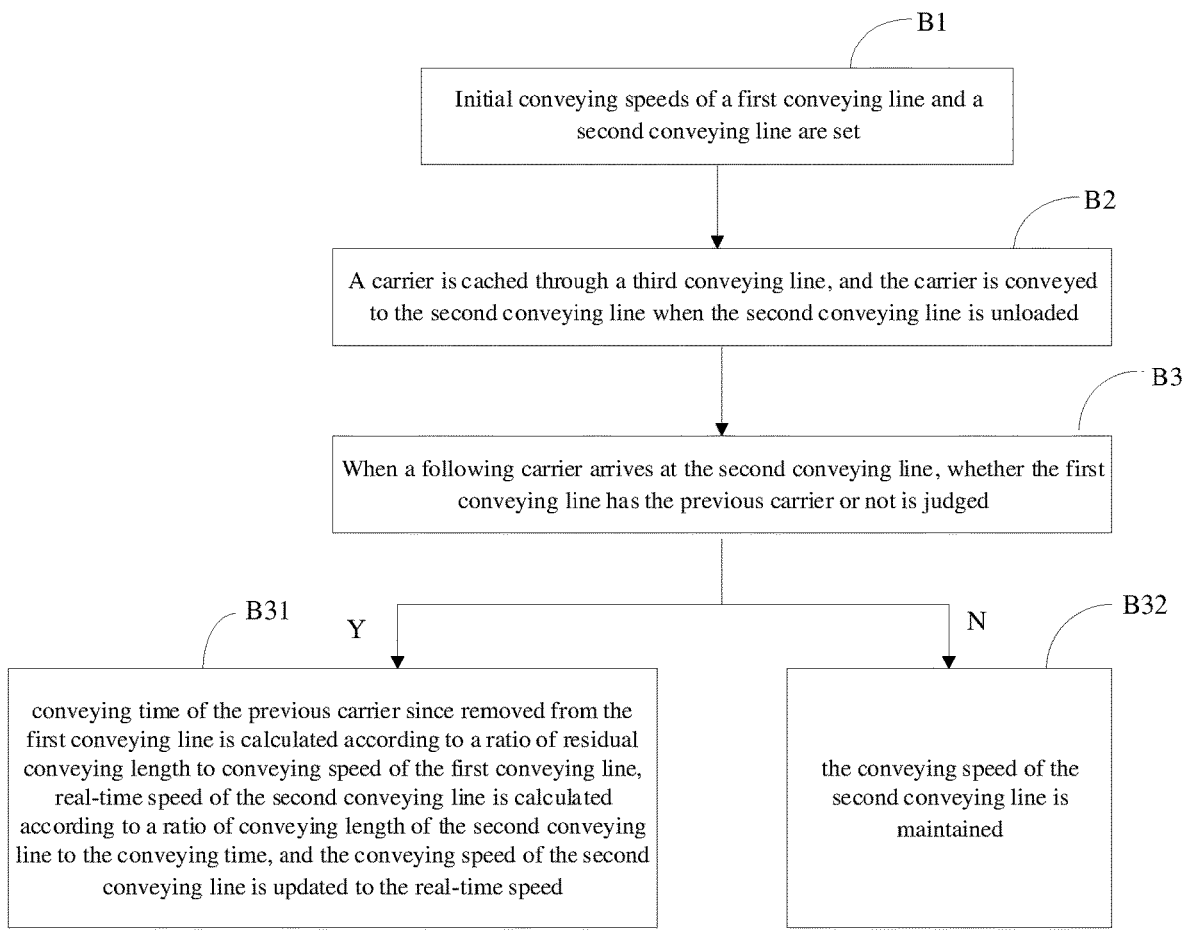
FIG. 8 is a flow chart of a working method of a high-speed and high-precision RFID detection tunnel machine in Embodiment 4.

In the embodiment, in a process of using the high-speed and high-precision RFID detection tunnel machine, the following working method is adopted, which, as shown in FIG. 8, includes the following steps: B1: initial conveying speeds of the first conveying line 3 and the second conveying line 6 are set; B2: a carrier 4 is cached through the third conveying line 7, and the carrier 4 is conveyed to the second conveying line 6 when the second conveying line 6 is unloaded; B3, when the following carrier 4 arrives at the second conveying line 6, whether the first conveying line 3 has the previous carrier 4 or not is judged; B31: if so, the conveying time of the previous carrier 4 since removed from the first conveying line 3 is calculated according to a ratio of residual conveying length to conveying speed of the first conveying line 3, real-time speed of the second conveying line 6 is calculated according to a ratio of conveying length of the second conveying line 6 to the conveying time, and the conveying speed of the second conveying line 6 is updated to the real-time speed; B32: otherwise, the conveying speed of the second conveying line 6 is maintained.

In the implementation mode, cache may be obtained when the carriers 4 are relatively concentrated, and the subsequent continuous detection work may be ensured by releasing the cache when the number is small, and other technical effects are the same as those in Embodiment 2, which will not be repeated here.

On the basis of the above Embodiments 2-4, as a preferred mode that may be adopted by all three, it also includes weight detection on the carrier 4 on the second conveying line 6, and the power of the signal is adjusted within the set range according to the weight detection result; specifically, when the detected weight exceeds the set range, or the range boundary is not used as the standard, but adjustment is carried out with the ratio of weight increase or decrease, and when the weight is large, the accuracy of the detection may be improved by increasing the power of the signal, and then influence of weight on the reading process is reduced.

The above descriptions are merely preferred embodiments of the application rather than limitations to the application in any form. Although the application has been disclosed in preferred embodiments, it is not intended to limit the application. Any one skilled in the art can make some changes or modifications to equivalent embodiments by using the above disclosed technical content without departing from the scope of the technical solution of the application. Any simple amendments, equivalent changes or modifications made to the above embodiments according to the technical essence of the application should fall in the scope of the technical solution of the application, without departing from the content of the technical solution of the application.

What is claimed is:

1. A working method of a high-speed and high-precision Radio Frequency Identification (RFID) detection tunnel machine,
    wherein the high-speed and high-precision RFID detection tunnel machine comprises:
    an RFID reader-writer and an RFID antenna, wherein the RFID reader-writer sends a signal to the RFID antenna, and the signal is converted by the RFID antenna and then is emitted outwards to form a reading range;
    a first conveying line, which conveys a carrier, wherein the carrier comprises at least one RFID tag;
    a tunnel machine body, which provides a through space with two open ends, wherein the through space is configured for the first conveying line to pass through, and also provides positions for installing the RFID reader-writer and the RFID antenna, and the tunnel machine body covers the reading range; and
    a second conveying line, which is butted with the first conveying line to convey the carrier and ensures that the first conveying line only has one carrier;
    wherein the working method comprises:
    setting initial conveying speeds of the first conveying line and the second conveying line;
    when a following carrier arrives at the second conveying line, judging whether the first conveying line has a previous carrier or not;
    if so, calculating a conveying time of the previous carrier since removed from the first conveying line according to a ratio of residual conveying length to conveying speed of the first conveying line, calculating real-time speed of the second conveying line according to a ratio of conveying length of the second conveying line to the conveying time, and updating a conveying speed of the second conveying line to the real-time speed; and
    otherwise, maintaining the conveying speed of the second conveying line.

2. The working method of the high-speed and high-precision RFID detection tunnel machine according to claim 1, further comprising:
    adjusting power of the signal within a set range according to change of speed difference of the first conveying line and the second conveying line.

3. The working method of the high-speed and high-precision RFID detection tunnel machine according to claim 1, further comprising: detecting weight of the carrier on the second conveying line, and adjusting the power of the signal within a set range according to the weight detection result.

4. The working method of the high-speed and high-precision RFID detection tunnel machine according to claim 1, wherein the RFID antenna is a circularly polarized antenna.

5. The working method of the high-speed and high-precision RFID detection tunnel machine according to claim 1, wherein the ratio of the initial conveying speeds of the first conveying line and the second conveying line is inversely proportional to the conveying length of the first conveying line and the second conveying line.

6. The working method of the high-speed and high-precision RFID detection tunnel machine according to claim 5, wherein the initial conveying speed of the first conveying line is smaller than or equal to a ratio of effective reading length to set reading time of the RFID antenna, and the effective reading length is smaller than length of the tunnel machine body.

7. A working method of a high-speed and high-precision RFID detection tunnel machine,
wherein the high-speed and high-precision RFID detection tunnel machine comprises:
an RFID reader-writer and an RFID antenna, wherein the RFID reader-writer sends a signal to the RFID antenna, and the signal is converted by the RFID antenna and then is emitted outwards to form a reading range;
a first conveying line, which conveys a carrier, wherein the carrier comprises at least one RFID tag;
a tunnel machine body, which provides a through space with two open ends, wherein the through space is configured for the first conveying line to pass through, and also provides positions for installing the RFID reader-writer and the RFID antenna, and the tunnel machine body covers the reading range; and
a second conveying line, which is butted with the first conveying line to convey the carrier and ensures that the first conveying line only has one carrier;
a third conveying line, which is configured to cache the carrier and convey the carrier to the second conveying line which is unloaded one by one;
wherein the working method comprises:
setting initial conveying speeds of the first conveying line and the second conveying line;
caching a carrier through the third conveying line, and conveying the carrier to the second conveying line when the second conveying line is unloaded;
when a following carrier arrives at the second conveying line, judging whether the first conveying line has a previous carrier or not;
if so, calculating a conveying time of the previous carrier since removed from the first conveying line according to a ratio of residual conveying length to conveying speed of the first conveying line, calculating real-time speed of the second conveying line according to a ratio of conveying length of the second conveying line to the conveying time, and updating a conveying speed of the second conveying line to the real-time speed; and
otherwise, maintaining the conveying speed of the second conveying line.

8. The working method of the high-speed and high-precision RFID detection tunnel machine according to claim 7, further comprising: detecting weight of the carrier on the second conveying line, and adjusting a power of the signal within a set range according to the weight detection result.

9. The working method of the high-speed and high-precision RFID detection tunnel machine according to claim 7, wherein the RFID antenna is a circularly polarized antenna.

* * * * *